US011516663B2

(12) United States Patent
Obaidi

(10) Patent No.: US 11,516,663 B2
(45) Date of Patent: Nov. 29, 2022

(54) SYSTEMS AND METHODS FOR SECURE ENDPOINT CONNECTION AND COMMUNICATION

(71) Applicant: T-Mobile USA, Inc., Bellevue, WA (US)

(72) Inventor: Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 705 days.

(21) Appl. No.: 16/505,846

(22) Filed: Jul. 9, 2019

(65) Prior Publication Data
US 2021/0014683 A1 Jan. 14, 2021

(51) Int. Cl.
*H04W 12/06* (2021.01)
*H04W 12/069* (2021.01)
*G06F 9/455* (2018.01)
*H04W 4/20* (2018.01)
*H04L 67/60* (2022.01)

(52) U.S. Cl.
CPC ...... *H04W 12/069* (2021.01); *G06F 9/45558* (2013.01); *H04L 67/60* (2022.05); *H04W 4/20* (2013.01); *G06F 2009/4557* (2013.01); *G06F 2009/45587* (2013.01); *G06F 2009/45595* (2013.01)

(58) Field of Classification Search
CPC .............. H04W 12/069; G06F 9/45558; G06F 2009/45587; G06F 21/53; H04L 67/32
See application file for complete search history.

(56) References Cited

U.S. PATENT DOCUMENTS

| 9,239,909 B2 | 1/2016 | Tedesco et al. |
| 9,461,982 B2 | 10/2016 | Rajagopal et al. |
| 10,044,695 B1 | 8/2018 | Cahill et al. |
| 2007/0050765 A1 | 3/2007 | Geisinger |

(Continued)

FOREIGN PATENT DOCUMENTS

WO    2018162060 A1    9/2018

OTHER PUBLICATIONS

European Search Report dated Oct. 28, 2020 issued in European Patent Application No. 20178351.1.

*Primary Examiner* — Ellen Tran
(74) *Attorney, Agent, or Firm* — Troutman Pepper Hamilton Sanders LLP; James E. Schutz; Christopher C. Close, Jr.

(57) ABSTRACT

A user equipment (UE) including: a processor; a transceiver; and a memory storing instructions that, when executed by the processor, controls the processor to: receive a communication request to communicate with a remote system; instantiate, in response to receiving the communication request, a UE virtual machine instance on the UE; generate a root certificate for the UE virtual machine instance; execute, on the UE virtual machine instance, an application for processing the communication request; transmit, through the transceiver and to an attestation server, the root certificate to attest to the execution of the application within the UE virtual machine instance; establish a communication link between the application and the remote system; and communicate, via the transceiver, with the remote system across the communication link.

20 Claims, 10 Drawing Sheets

(56) References Cited

U.S. PATENT DOCUMENTS

| | | | |
|---|---|---|---|
| 2014/0137115 A1* | 5/2014 | Tosa | G06F 9/45558 |
| | | | 718/1 |
| 2016/0134623 A1 | 5/2016 | Roth et al. | |
| 2016/0366185 A1* | 12/2016 | Lee | G06F 9/45558 |
| 2017/0222981 A1* | 8/2017 | Srivastav | H04L 63/0428 |
| 2019/0007378 A1 | 1/2019 | Jowett et al. | |
| 2019/0075130 A1 | 3/2019 | Petry et al. | |
| 2019/0149539 A1* | 5/2019 | Scruby | H04W 12/068 |
| | | | 713/168 |

* cited by examiner

SYSTEMS AND METHODS FOR SECURE ENDPOINT CONNECTION AND COMMUNICATION

FIELD

Examples of the present disclosure relate generally to security, and, more particularly, to secure connection and communication with dynamic creation and enforcement of virtual machine (VMs) protocols to secure both ends of a remote connection.

BACKGROUND

Protecting users and their network devices from security breaches is an ever-present concern with computer systems. As computer system complexity and user reliance thereon increases, so to do the opportunities for security breaches and the risks associated therewith increase.

In the related art, encryption has been used to address some of these concerns. However, encryption as such presents a number of drawbacks. For example, encrypting data presents an overhead both when the data is encrypted, and anytime the data is used (as it must be decrypted) and modified (as the modified data must be re-encrypted). Moreover, encryption fails to protect sensitive data adequately in various circumstances. For example, encryption of data does not prevent spying when the computer system itself is compromised (e.g., compromised through a lack of data isolation). Thus, an application executing on user equipment (UE) can "eavesdrop" on information utilized by other applications. For instance, when one application decrypts data on the UE, other applications executing on the UE may copy or otherwise utilize the decrypted data. Additionally, even if you can guarantee the safety of your computer system, communicating with a third-party system leaves the data vulnerable to breaches in the third-party system.

Accordingly, there is a need for improved systems and methods for ensuring secure communication between remote devices. More specifically, a need exists for providing security that extends beyond encryption, and ensures communication endpoints are operating in a secure environment. Aspects of the present disclosure are related to these and other concerns.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, there is a persistent concern about securing sensitive information, especially when communicating with a remote device. The related art attempts to address these concerns with encrypted data and channels. However, as mentioned, encryption does not protect against eavesdropping or ensure that a third-party device is utilizing a secure operating environment.

Therefore, it is desirable to have an improved mechanism for providing device security and a secure connection. In some examples of the present disclosure, when secure communication is desired, a first device instantiates an isolated virtual machine (VM) instance, executes an application for communication in the VM instance, and attests to this arrangement to an attesting server. Then, before the first device connects with a second device, the first device requests from the attestation server whether the second device is likewise validly operating with the VM. If the server attests that the second device is validly operating, the first device will connect to the second device and communicate therewith. Once the communication is complete, the first device can close the application and delete the VM instance.

In some examples, a secure root certificate is used to guarantee the attestation. In some cases, upon closing of the communication, the user may be presented options for persisting information related to the communication. As a non-limiting example, a user may desire to save an image received by the application executed on the VM. When the connection is closed, the user may instruct the VM instance to persist the image in a cloud storage program, which may be accessed by the user after the VM instance is deleted.

Although aspects of the present disclosure are generally discussed with reference to UEs and service providers, these are merely examples. One of ordinary skill in the art will recognize that aspects of the present disclosure may be applied to various fields and challenges. As a non-limiting example, an unmanned aerial vehicle (UAV) and a monitoring station may communicate with video capture and streaming programs, respectively. Before establishing a connection, the UAV may require the monitoring station to execute the streaming program within a VM. Once the VM use is attested to, the UAV may provide its video stream to the monitoring station.

Reference will now be made in detail to aspects of the disclosed technology, examples of which are illustrated in the accompanying drawings and disclosed herein. Wherever convenient, the same reference numbers will be used throughout the drawings to refer to the same or like parts.

Figure 1:
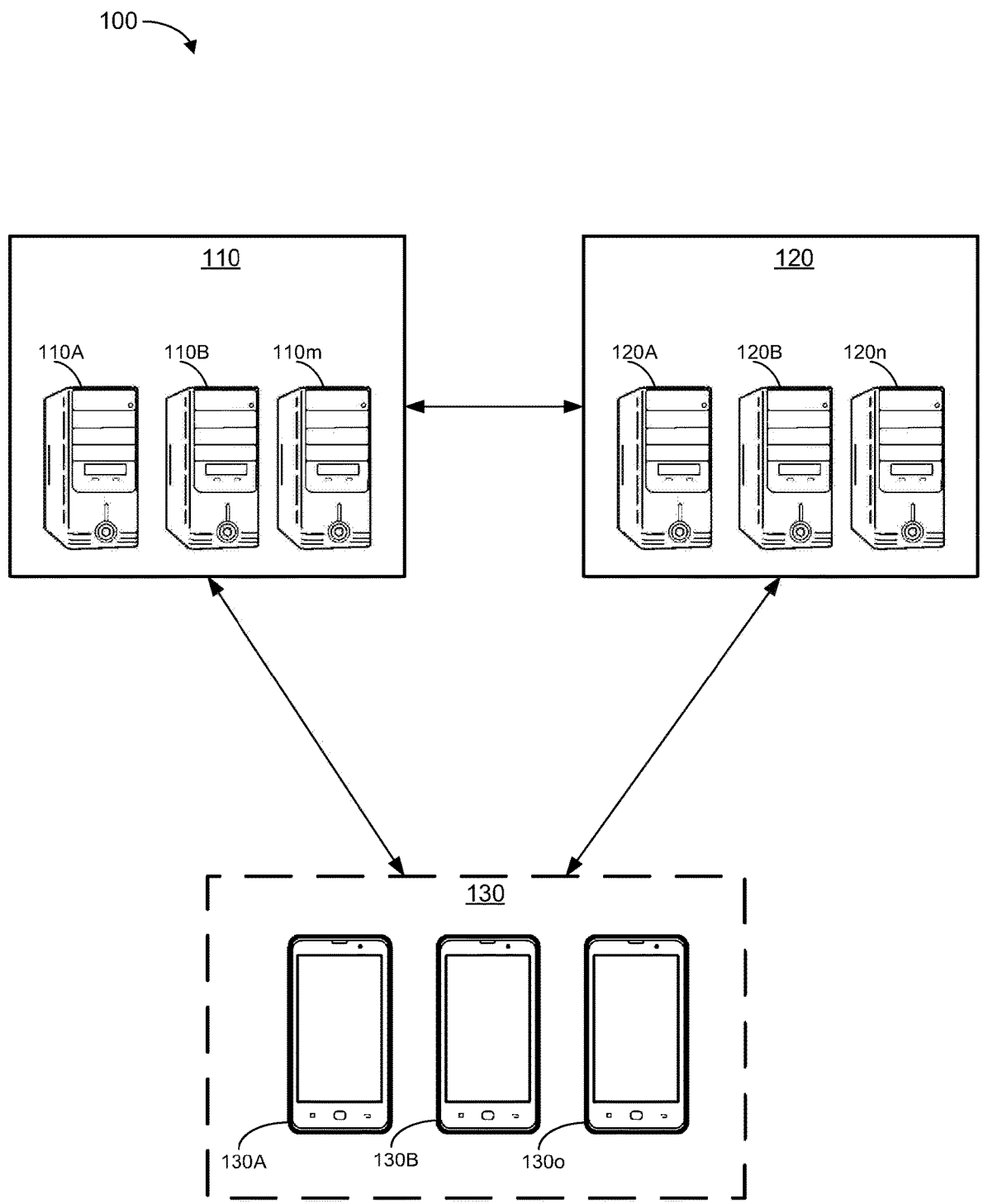
FIG. 1 is a diagram of an example of a system environment for secure endpoint connection and communication including user equipment (UE), attestation servers, and an external device in accordance with some examples of the present disclosure.

As shown in FIG. 1, an example of the present disclosure can comprise a system environment 100 in which endpoint connection and communication in accordance with some examples of the present disclosure may be performed. The components and arrangements shown in FIG. 1 are not intended to limit the disclosed embodiments as these components and features may vary. In FIG. 1, the system environment 100 can include one or more Attestation Nodes 110A-110m, one or more Providers 120A-120n, and one or more UEs 130A-130o. In some examples, Attestation Node 110, Provider 120, and UE 130 may communicate with one another. Additionally, one or more of Attestation Nodes 110A-110m, one or more of Providers 120A-120n, and one or more of UEs 130A-130o may communicate with each other (e.g., UE 130A may communicate with UE 130B). Attestation Nodes 110A-110m, the one or more Providers 120A-120n, and the one or more UEs 130A-130o may each include one or more processors, memories, root certificates, and/or transceivers. As non-limiting examples, the one or more UEs 130A-130o may be cell phones, smartphones, laptop computers, tablets, or other personal computing devices that include the ability to communicate on one or more different types of networks. Attestation Nodes 110A-110m and/or the one or more Providers 120A-120n may include one or more physical or logical devices (e.g., servers, cloud servers, access points, etc.) or drives. Example computer architectures that may be used to implement UEs 130A-130o, Attestation Nodes 110A-110m, and Providers 120A-120n are described below with reference to FIGS. 6 and 7.

When UE 130 and/or Provider 120 desire to communicate (e.g., by receiving an indication to launch an application or a communication request), a security process (e.g., executed by a hypervisor) may instantiate a VM instance and execute the application on the VM instance. UE 130 and/or Provider 120 create a certificate (e.g., a root certificate) for the VM instance and transmit the attestation to an attestation server 110. Before UE 130 and/or Provider 120 connects with another device, it will request attestation of the other device from the Attestation Node 110. If the other device is deemed to be executing within a secure VM environment, UE 130 and/or Provider 120 connects to the other device.

Attestation Nodes 110A-110m may serve as an authority for secure operation. In some cases, Attestation Nodes 110A-110m may be nodes of a private blockchain that stores attestations of the use of the VM environment by UE 130 and Provider 120. The attestations may be received from UE 130 and Provider 120. The attestations may be root attestations corresponding to a hardware root certificate of UE 130 and/or Provider 120. When Attestation Node 110 receives a request for attestation information of a particular device, it refers to the previously received attestations to determine whether the particular device is validly executing in a virtual instance. Attestation Nodes 110A-110m may be maintained by respective known/trusted entities. For example, in some embodiments, a plurality of cellular providers (who also maintain Providers 120A-120n) may each maintain one or more of Attestation Nodes 110A-110m.

In some examples, Providers 120A-n provide one or more services to UE 130 and can communicate with one or more of Attestation Nodes 110A-110m. Providers 120A-n may also communicate with UE 130. For example, Providers 120A-n may serve as application servers corresponding to different applications (e.g., banking, mapping, web search, messaging, etc.). Providers 120A-n may attest to their execution of VMs to one or more of Attestation Nodes 110A-110m. Provider 120 may utilize a hardware root certificate to generate an attestation of a VM instance running thereon, for example, when the VM is instantiated or when the application executes. Providers 120 may attest to one or more of Attestation Nodes 110A-110m that Provider 120 is communicating within a secure VM instance.

When a first provider (e.g., Provider 120A) is to interact with a second provider (e.g., Provider 120B), the first provider will check with one or more of Attestation Nodes 110A-110m to determine whether the second provider has attested to its execution within a VM instance. Likewise, the second provider will check with one or more of Attestation Nodes 110A-110m to determine whether the first provider has attested to its execution within a VM instance. If both the first and second providers have attested accordingly to Attestation Nodes 110A-110m, the first and second providers will connect to each other.

UE 130 may communicate with the at least one Attestation Node 110 and at least one Provider 120. UE 130 may attest to its execution of VMs to one or more of Attestation Nodes 110A-110m. UE 130 may utilize a hardware root certificate to generate an attestation of a VM instance running thereon, for example, when the VM is instantiated or when the application executes. UE 130 may attest to one or more of Attestation Nodes 110A-110m that UE 130 is communicating within a secure VM instance.

When UE 130 wants to interact with a Provider 120 or another device (e.g., another UE 130), such as in response to a request from a user, UE 130 will check with one or more of Attestation Nodes 110A-110m to determine whether the provider or other device has attested to its execution within a VM instance. If the one or more of Attestation Nodes 110A-110m confirms Provider 120 or other device has attested accordingly to Attestation Nodes 110A-110m, UE 130 will connect to Provider 120 or other device. If the one or more of Attestation Nodes 110A-110m indicates that Provider 120 or other device has not attested (or its attestation indicates that the other device is invalid), UE 130 will not connect to Provider 120 or other device. In some cases, UE 130 may output a notice (e.g., to a user of UE 130 via a graphical user interface) that Provider 120 or other device is potentially operating in a compromised environment. The user may be able to instruct or command UE 130 (e.g., through the graphical user interface) to connect to Provider 120 or other device despite the attestation of invalidity.

In some examples, Attestation Nodes 110A-110m, Providers 120A-120n, and UEs 130A-130o may be associated with respective entities. For example, each Provider 120 may be a physical device (e.g., server, access point, or network node) controlled by a cellular provider of a plurality of cellular providers or one or more business entities. Similarly, each Attestation Node 110 may be maintained or associated with a cellular provider among the plurality of cellular providers, e.g., for cellular or data service. Each UE 130 may subscribe to a cellular provider among the plurality of cellular providers. Providers 120A-120n may communicate with Attestation Nodes 110A-110m associated with a same cellular provider. UEs 130A-130o may likewise communicate with Attestation Nodes 110A-110m associated with a same cellular provider. In this way, the authority of Attestation Nodes 110A-110m may be established through the cellular provider (e.g., respective entities).

Figure 2A:
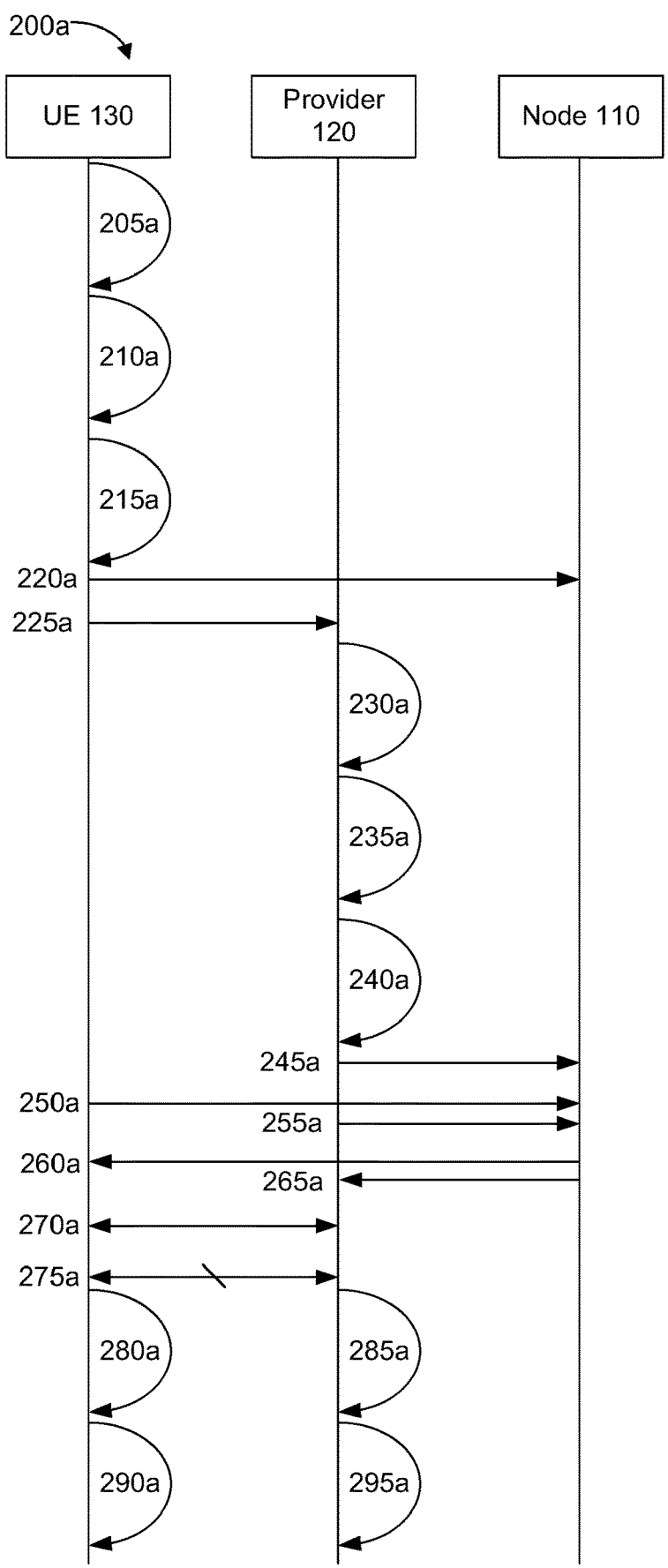
FIGS. 2A-2C are timing diagrams depicting methods of providing secure endpoint connection and communication, in accordance with some examples of the present disclosure.

FIG. 2A illustrates a timing diagram for an example of a method 200a for providing secure endpoint communication in accordance with aspects of the present disclosure. The timing diagram illustrates a UE 130, a Provider 120, and an Attestation Node 110. As a non-limiting example, UE 130, Provider 120, and Attestation Node 110 (or Node 11) may all be associated with a same first cellular provider.

Referring to FIG. 2A, at 205a, UE 130 receives an indication to execute an application (e.g., a user instruction to launch an application). At 210a, UE 130 instantiates a VM instance and executes the application within the VM instance. For example, hypervisor executing on UE 130 may instantiate an isolated VM instance for the application. At 215*a*, UE 130 may then create an attestation to the application operating within the VM instance. For example, a root hardware certificate may be generated for the VM instance. At 220*a*, UE may attest to its security status to Node 110 (e.g., by sharing the generated root hardware certificate).

In an example, a hypervisor of UE 130 may instantiate the VM instance and allocate hardware resources (e.g., processor power, memory) to the VM instance. The VM instance may include a copy of a primary operating system of UE 130. However, this is merely an example. In some cases, the hypervisor may instantiate the VM with a different operating system (e.g., type or version number), and/or a customized version of the operating system. For example, if certain functionality is known to be unneeded for an application executing within the VM instance, a hypervisor may select an operating system that does not provide those features. This can reduce overhead in instantiating and deleting the VM instance, as well as limiting the required hardware allocation.

At 225*a*, UE 130 sends a communication request to Provider 120. The request may indicate that UE 130 requires Provider 120 to communicate with it from within an isolated VM instance (e.g., to prevent eavesdropping). In an example, the request may be directed to a subroutine of Provider 120. In an example, the request may be directed to a communication application of Provider 120, which may request the instantiation of a VM instance from a hypervisor. At 230*a*-245*a*, Provider 120 instantiates a VM instance (230*a*), executes the application within the VM instance for communication (235*a*), creates an attestation to the application operating within the VM instance (240*a*), and attests to its security status to Node 110 (245*a*). As will be understood by one of ordinary skill, these actions may be substantially similar to like actions performed by UE 130. In some cases, instantiating the VM instance at 230*a* may be triggered by the request from UE 130. For example, a hypervisor of Provider 120 may instantiate the VM instance and allocate hardware resources (e.g., processor power, memory) to the VM instance. The hypervisor may instantiate the VM instance with a same or different operating system (e.g., type or version number) as a primary operating system of Provider 120, and/or a customized version of the operating system, for example, in a way that may reduce overhead or latency of the WM instance.

Prior to connecting, at 250*a* and 255*a*, each of UE 130 and Provider 120 request or "poll" Attestation Node 110 for attestation information indicating that the other is operating within a secure VM environment. For example, Provider 120 may poll Attestation Node 110 in response to receiving the request from UE 130, and UE 130 may poll Attestation Node 110 in response to receiving a communication response indicating that Provider 120 wants to connect to UE 130. At 260*a* Node 110 provides to UE 130 the attestation information that Provider 120B is operating a VM instance. Likewise, at 265*a* Node 110 provides to Provider 120 the attestation information that UE 130 is operating a VM instance. At 270*a*, after receiving the attestation, UE 130 and Provider 120 establish a connection and communicate through applications executing on the respective VM instances.

Once communication ceases (e.g., a user closes the application executing on UE 130), at 275*a* the communication link is disconnected. At 280*a* and 285*a*, UE 130 and Provider 120 close the application. At 290*a* and 295*a*, UE 130 and Provider 120 delete the respective VM instances.

In some cases, prior to deleting the VM instance, UE 130 may provide an opportunity to save data from the communication link. For example, UE 130 may (e.g., under the direction of a user) store data (e.g., communication information) from the VM instance in a cloud service and/or encrypt the data on UE 130. In some cases, when the connection is closed, the VM instance may connect to an operating system on UE 130 and provide the data to the operating system for persistence on UE 130.

Figure 2B:
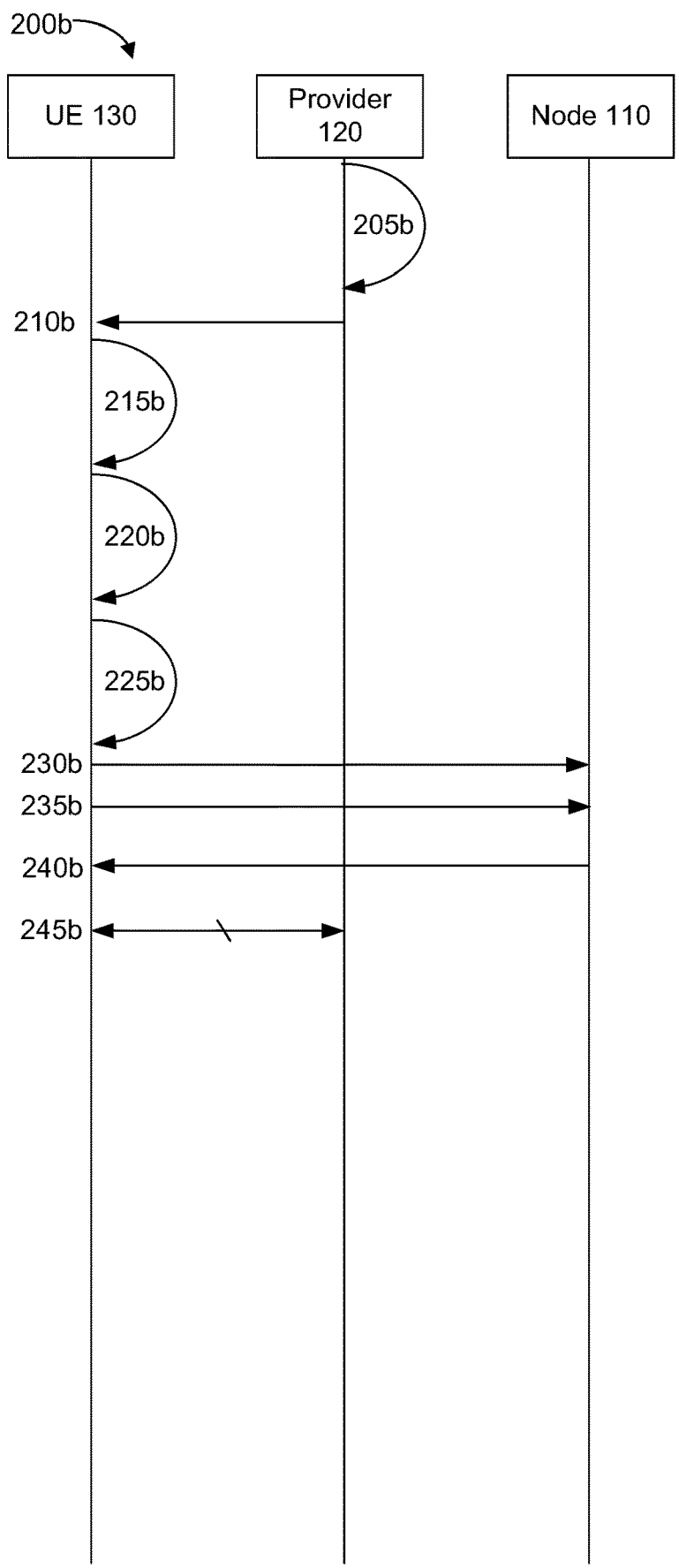

FIG. 2B illustrates a timing diagram for an example of a method 200 for providing secure endpoint communication in accordance with aspects of the present disclosure. The timing diagram illustrates a UE 130, a Provider 120, and an Attestation Node 110.

Referring to FIG. 2B, at 205*b*, Provider 120 receives an indication to communicate with UE 130 (e.g., to send a notification to UE 130). At 210*b*, Provider 120 sends a communication request to UE 130. At 215*b*, UE 130 receives the communication request and instantiates a VM instance to execute an application for communicating with Provider 120 within the VM instance. For example, a hypervisor executing on UE 130 may instantiate an isolated VM instance for the application. At 220*b*, UE 130 may then create an attestation to the application operating within the VM instance. For example, a root hardware certificate may be generated for the VM instance. At 225*b*, UE 130 may attest to its security status to Node 110 (e.g., by sharing the generated root hardware certificate). In some cases, instantiating the VM instance at 230*b* may be triggered by the request from Provider 120 and/or identifying the application to communicate with Provider 120.

Prior to connecting, at 235*b*, UE 130 requests or "polls" Attestation Node 110 for attestation information indicating that Provider 120 is operating within a secure VM environment. At 240*b*, Node 110 provides to UE 130 the attestation information that Provider 120B is not operating a VM instance. Accordingly, at 245*b*, UE 130 denies the request to communicate from Provider 120. One of ordinary skill will recognize that this is merely an example. In some cases, prior to canceling the request, UE 130 may notify a user that Provider 120 is not operating a VM instance and shared data may be compromised. In response to receiving instructions from the user (e.g., input into UE 130), UE 130 may establish a connection with Provider 120. In some instances, before denying the request, UE 130 may notify Provider 120 that it requires Provider 120 to communicate with it from within an isolated VM instance (e.g., to prevent eavesdropping). Provider 120 may then be given an opportunity to instantiate a VM and execute a communication application therein.

In some cases, prior to instantiating a VM, UE 130 and/or Provider 120 may check the requisite application and/or security protocols. If and only if the application and/or security protocols require the application to execute within a VM instance will UE 130 and Provider 120 instantiate the VM instance. In an example, the types of applications necessary to be executed within a VM instance may be identified and/or selected by a user (e.g., pre-existing user selection). In some cases, different functionality or sessions of a same application may be required to execute within different VM instances. For example, a messaging application may require each message thread (e.g., each conversation with different contacts) to be executed within different VM instances.

Figure 2C:
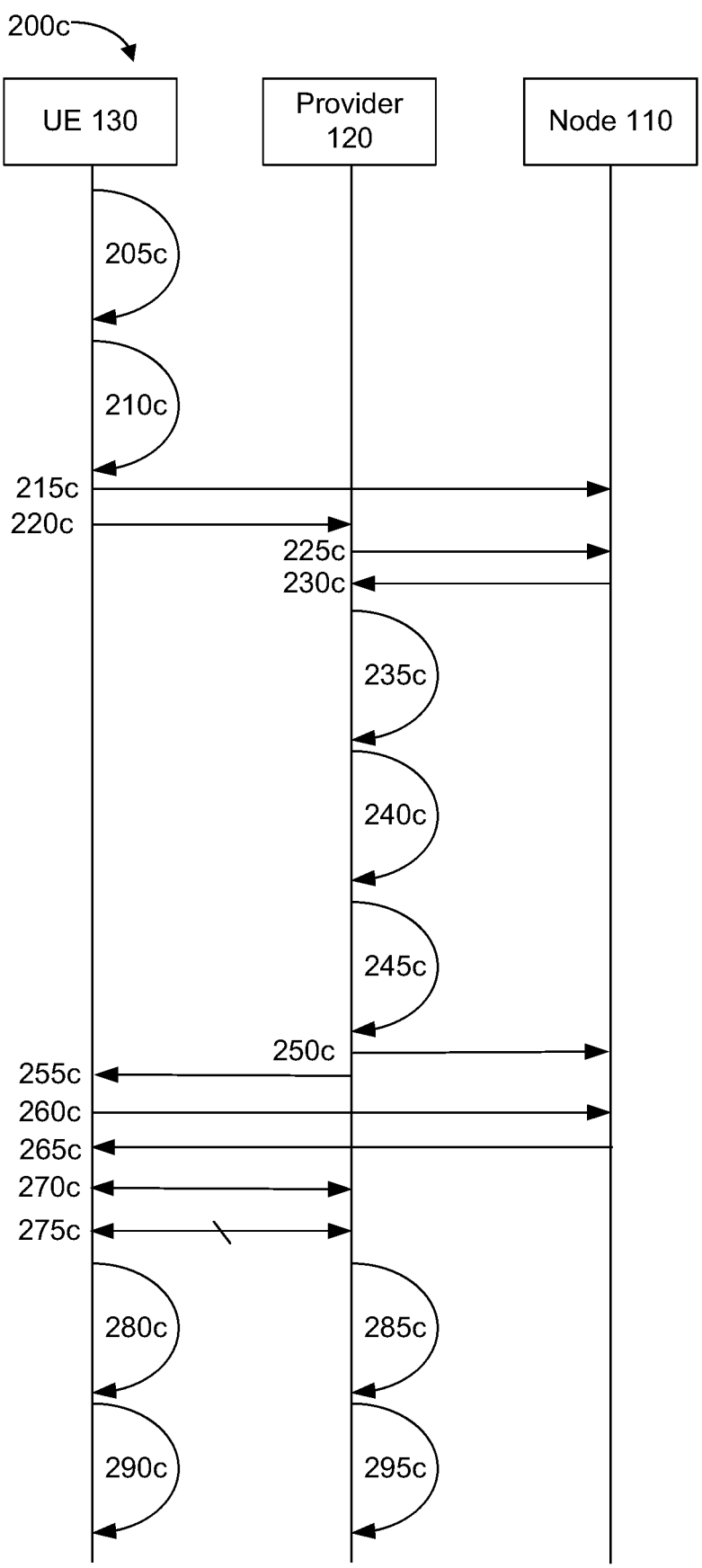

FIG. 2C illustrates a timing diagram for an example of a method 200*c* for providing secure endpoint communication in accordance with aspects of the present disclosure. The timing diagram illustrates a UE 130, a Provider 120, and an Attestation Node 110. As a non-limiting example, UE 130, Provider 120, and Attestation Node 110 may all be associated with a same first cellular provider.

Referring to FIG. 2C, at 205*c*, UE 130 instantiates a VM instance and executes an application within the VM instance. For example, hypervisor executing on UE 130 may instantiate an isolated VM instance for the application. At 210*c*, UE 130 may then create an attestation to the application operating within the VM instance. For example, a root hardware certificate may be generated for the VM instance. At 215*c*, UE may attest to its security status to Node 110 (e.g., by sharing the generated root hardware certificate). The features may be substantially similar to corresponding features discussed above with reference to FIG. 2A.

At 220*c*, UE 130 sends a communication request to Provider 120. The request may indicate that UE 130 requires Provider 120 to communicate with it from within an isolated VM instance (e.g., to prevent eavesdropping). In an example, the request may be directed to a subroutine of Provider 120. In an example, the request may be directed to a communication application of Provider 120, which may request the instantiation of a VM instance from a hypervisor.

At 225*c*, Provider 120 requests or "polls" Attestation Node 110 for attestation information indicating that UE 130 is operating within a secure VM environment. For example, Provider 120 may poll Attestation Node 110 in response to receiving the request from UE 130. At 230*c* Node 110 provides to Provider 120 the attestation information that UE 130 is operating a VM instance At 235*c*-250*c*, Provider 120 instantiates a VM instance (235*c*), executes the application within the VM instance for communication (240*c*), creates an attestation to the application operating within the VM instance (245*c*), and attests to its security status to Node 110 (250*c*). As will be understood by one of ordinary skill, these actions may be substantially similar to like actions performed by UE 130. In some cases, instantiating the VM instance at 235*c* may be triggered by the request from UE 130. Then, at 255*c*, Provider 120 indicates to UE 130 (e.g., through the application executing on its VM instance) that it approves the request to communicate.

Prior to connecting, at 260*c*, UE 130 requests or "polls" Attestation Node 110 for attestation information indicating that Provider 120 is operating within a secure VM environment. For example, UE 130 may poll Attestation Node 110 in response to receiving the communication response indicating that Provider 120 wants to connect to UE 130. At 265*c* Node 110 provides to UE 130 the attestation information that Provider 120B is operating a VM instance. At 270*c*, after receiving the attestation, UE 130 and Provider 120 establish a connection and communicate through applications executing on the respective VM instances.

Once communication ceases (e.g., a user closes the application executing on UE 130), at 275*c* the communication link is disconnected. At 280*c* and 285*c*, UE 130 and Provider 120 may close the application. At 290*c* and 295*c*, UE 130 and Provider 120 may delete the respective VM instances.

One of ordinary skill will recognize that the descriptions of methods 200*a*, 200*b*, and 200*c* are merely examples, and various changes, alterations, additions and/or subtractions may be made without departing from the scope of the present disclosure.

Figure 3:
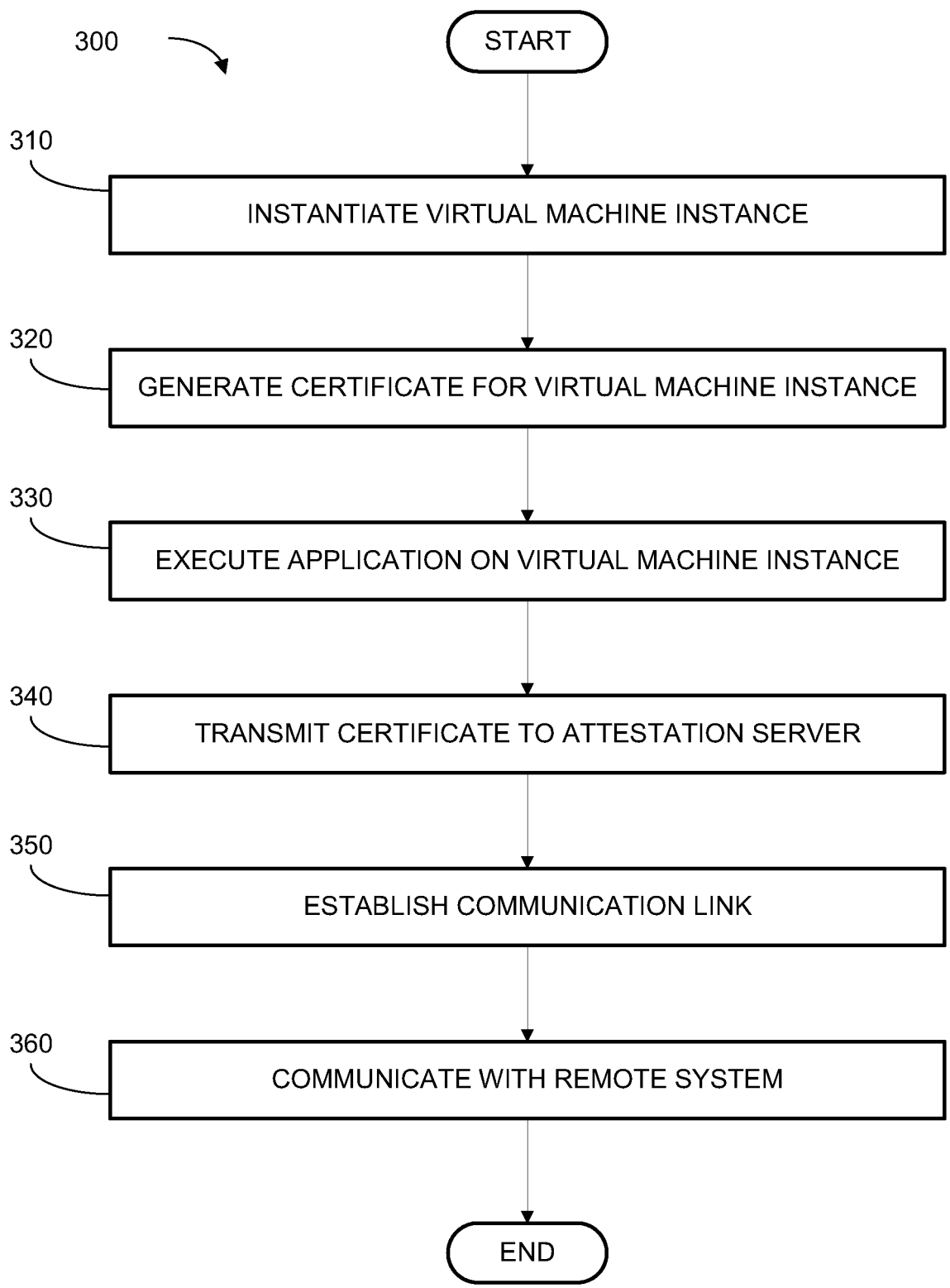
FIG. 3 is a flowchart depicting secure endpoint connection and communication, in accordance with some examples of the present disclosure.

FIG. 3 illustrates a flowchart for an example of a method 300 for providing secure endpoint communication in accordance with aspects of the present disclosure. The flowchart illustrates method 300 from the perspective of UE 130 (e.g., UE 130A-130*o* or a local system). UE 130 may communicate with a remote system (e.g., Provider 120) to, for example, access and/or modify a user account. Further, UE 130 may communicate with one or more Attestation Nodes 110 (e.g., Nodes 110A-110*m*) to attest to its own use of VM instances.

At 310, UE 130 instantiates a VM instance. The instantiation may be, for example, in response to a user request to execute an application and/or in response to receiving a communication request from a remote system (e.g., Provider 120 or another UE 130A-130*o*). In some cases, instantiation of a VM instance may only occur if the application is designated to require isolation.

At 320, UE 130 generates a certificate for the VM instance. The certificate may be based on a root certificate for the underlying hardware of UE 130. As a non-limiting example, the root certificate may be an unalterable characteristic of a processor executing on UE 130.

At 330, UE 130 executes the application on or within the VM instance on UE 130. By operating within the VM instance, the application may be isolated from vulnerabilities of UE 130 caused by other applications. At 340, UE 130 attests to its use of VM instance to execute the application to a server (e.g., Attestation Node 110). For example, UE 130 may share its certificate for the VM instance with the server. At 350, UE 130 may then accept the request to communicate and establish a communication link with a remote system and, at 360, communicate with the remote system through the communication link.

Once communication ceases (e.g., a user closes the application executing on UE 130), the communication link is disconnected, and UE 130 may close the application and delete the VM instance.

Although the method 300 has been discussed with reference to a UE 130, this is merely an example. One of ordinary skill will recognize in light of the present disclosure that aspects of the present disclosure may be implemented by Provider 120 and/or other systems or devices.

Figure 4:
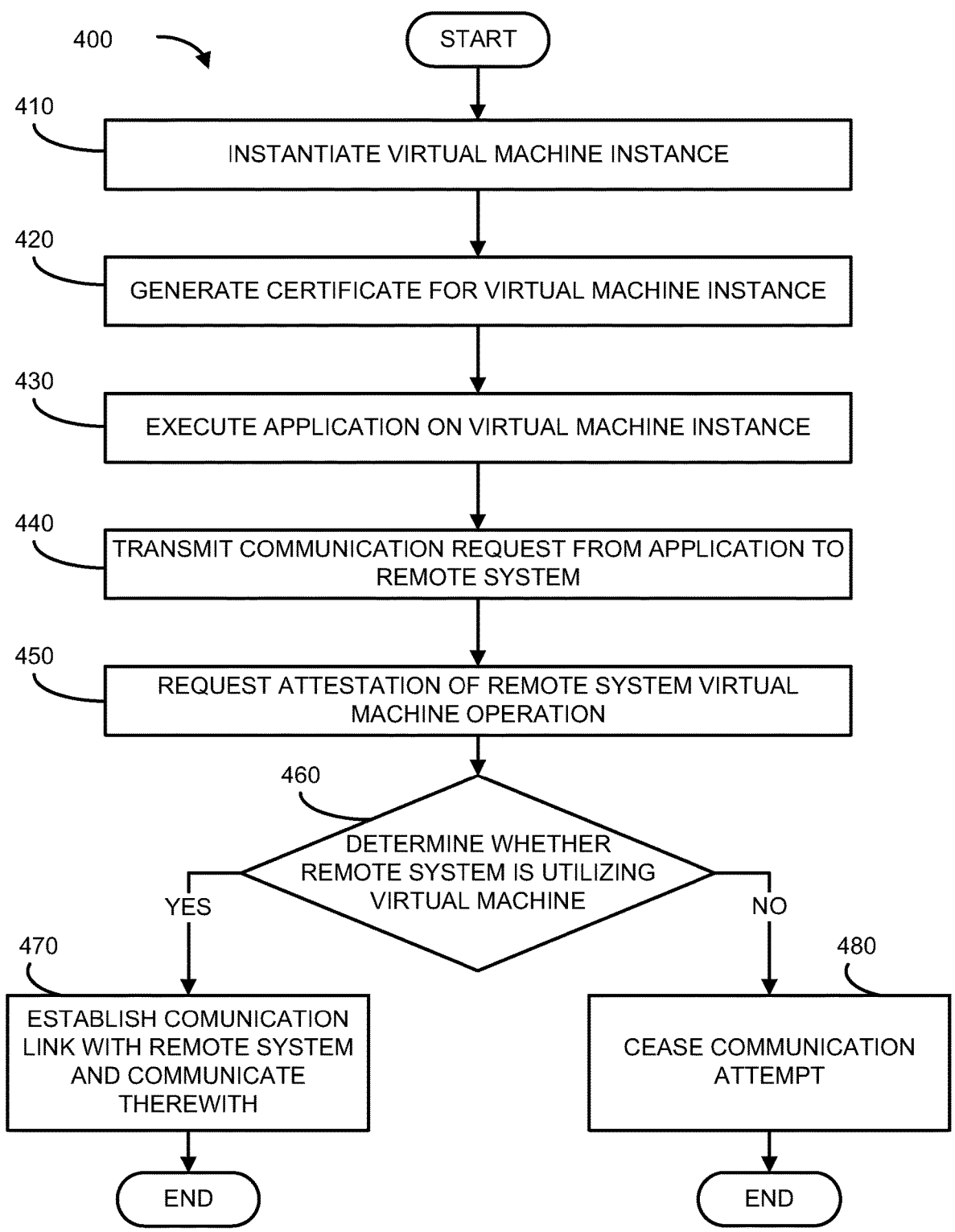
FIG. 4 is a flowchart depicting a method for secure endpoint connection and communication, in accordance with some examples of the present disclosure.

FIG. 4 is a flowchart of an example of a method 400 for providing secure endpoint communication in accordance with aspects of the present disclosure. The flowchart is from the perspective of a UE 130 (e.g., UE 130A-130*o* or a local system) in communication with an Attestation Node 110 (e.g., one or more of Nodes 110A-110*m*) and a remote system (e.g., Provider 120A-120*n*). UE 130 may receive an indication to connect with Provider 120, and, prior to connection, determine whether Provider 120 is communicating through a VM instance.

At 410, UE 130 instantiates a VM instance. The instantiation may be, for example, in response to a user request to execute an application and/or in response to receiving a communication request from a remote system (e.g., Provider 120 or another UE 130A-o), hereafter referred to as Provider 120 in the discussion of FIG. 4. In some cases, instantiation of a VM instance may only occur if the application is designated to require isolation.

At 420, UE 130 generates a certificate for the VM instance. The certificate may be based on a root certificate for the underlying hardware of UE 130. As a non-limiting example, the root certificate may be an unalterable characteristic of a processor executing on UE 130.

At 430, UE 130 executes the application within the VM instance on UE 130. By operating within the VM instance, the application may be isolated from vulnerabilities of UE 130 caused by other applications. At 440, UE 130 attests to its use of a VM instance to execute the application to a server (e.g., Attestation Node 110). For example, UE 130 may share its certificate for the VM instance with the server.

At 450, UE 130 requests an attestation of Provider 120 from Attestation Node 110. Node 110 may be a node from a plurality of Attestation Nodes 110A-110m that are related to a same entity (e.g., cellular service provider), hardware provider (e.g., make of a processor of UE 130), or account manager (e.g., bank account manager) as UE 130. The request for attestation may include an address of Provider 120. Node 110 may then look up the provider's 120 attestation based on its address, and provide the attestation to UE 130. In some cases, such a request may only be made if the application executing on UE 130 requires Provider 120 to communicate through a VM instance (e.g., based on application and/or security rules).

At 460, UE 130 determines whether the provider is validly communicating through a VM instance. For example, UE 130 determines whether the attestation from Node 110 indicates that Provider 120 is potentially compromised.

If Provider 120 is determined to be communicating through a VM instance (460—Yes), then, at 470, UE 130 establishes a connection with Provider 120. UE 130 and Provider 120 may then exchange data. However, if Provider 120 is determined to not be communicating through a VM instance (460—No), then, at 480, UE 130 denies the request for connection with Provider 120. In some cases, UE 130 may output a notice that Provider 120 is potentially compromised. A user of UE 130 may, in some implementations, override the decision and instruct UE 130 to connect to Provider 120.

FIG. 4 is described in terms of UE 130 connecting with a Provider 120. However, this is merely an example. In light of the present disclosure, one of ordinary skill will recognize that various other systems (e.g., UEs 130A-130o and/or Providers 120A-120n) can perform a similar method when connecting to a device as described above, so long as a connecting device has attested to their implementation of VM instances consistent with this application.

Figure 5:
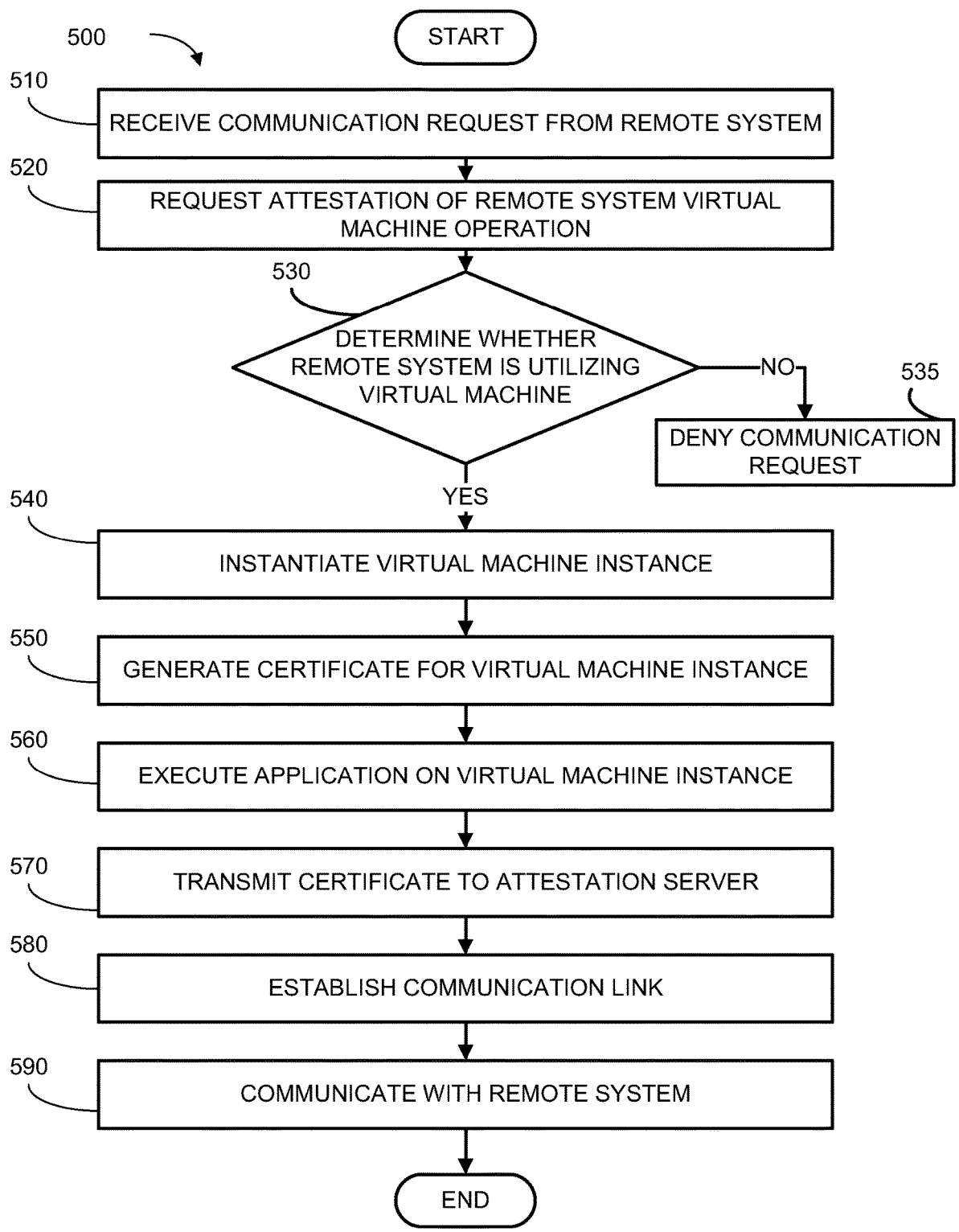
FIG. 5 is a flowchart depicting secure endpoint connection and communication, in accordance with some examples of the present disclosure.

FIG. 5 illustrates a flowchart for an example of a method 500 for providing secure endpoint communication in accordance with aspects of the present disclosure. The flowchart illustrates method 500 from the perspective of UE 130 (e.g., UE 130A-130o or a local system). UE 130 may communicate with a remote system (e.g., Provider 120) to, for example, access and/or modify a user account. Further, UE 130 may communicate with one or more Attestation Nodes 110 (e.g., Nodes 110A-110m) to attest to its own use of VM instances.

At 510, UE 130 receives a communication request from a remote system (e.g., from Provider 120 or another UE 130A-o). The communication request may indicate an application that is to be used to communicate with the remote system, hereafter referred to as Provider 120 in the discussion of FIG. 5. In some cases, the request may indicate that a VM instance is required for the communication.

At 520, UE 130 requests an attestation of Provider 120 from Attestation Node 110. Node 110 may be a node from a plurality of Attestation Nodes 110A-110m that are related to a same entity (e.g., cellular service provider), hardware provider (e.g., make of a processor of UE 130), or account manager (e.g., bank account manager) as UE 130. The request for attestation may include an address of Provider 120. Node 110 may then look up the provider's 120 attestation based on its address, and provide the attestation to UE 130. In some cases, such a request may only be made if UE 130 requires Provider 120 to communicate through a VM instance (e.g., based on application and/or security rules).

At 530, UE 130 determines whether the provider is validly communicating through a VM instance. For example, UE 130 determines whether the attestation from Node 110 indicates that Provider 120 is potentially compromised. If Provider 120 is determined to not be communicating through a VM instance (530—No), then, at 535, UE 130 denies the request for connection with Provider 120. In some cases, UE 130 may output a notice that Provider 120 is potentially compromised. A user of UE 130 may, in some implementations, override the decision and instruct UE 130 to connect to Provider 120. In some cases, UE 130 may notify Provider 120 that communication must be performed through a secure VM instance (i.e., before or with the denial).

If Provider 120 is determined to be communicating through a VM instance (530—Yes), then, at 540, UE 130 instantiates a VM instance. In some cases, instantiation of a VM instance may only occur if the application is designated to require isolation, or if the request indicates that Provider 120 requires communication through an isolated VM instance.

At 550, UE 130 generates a certificate for the VM instance. The certificate may be based on a root certificate for the underlying hardware of UE 130. As a non-limiting example, the root certificate may be an unalterable characteristic of a processor executing on UE 130.

At 560, UE 130 executes the application on or within the VM instance on UE 130. By operating within the VM instance, the application may be isolated from vulnerabilities of UE 130 caused by other applications. At 570, UE 130 attests to its use of the VM instance to execute the application to a server (e.g., Attestation Node 110). For example, UE 130 may share its certificate for the VM instance with the server. At 580, UE 130 may then accept the request to communicate and establish a communication link with remote system and, at 590, communicate with the remote system through the communication link.

Once communication ceases (e.g., a user closes the application executing on UE 130), the communication link is disconnected, and UE 130 may close the application and delete the VM instance.

Although the method 500 has been discussed with reference to a UE 130, this is merely an example. One of ordinary skill will recognize in light of the present disclosure that aspects of the present disclosure may be implemented by Provider 120 and/or other systems or devices.

Additionally, although methods 200a, 200b, 200c, 300, 400, 500 have generally been described in regard to communication between UE 130 and Provider 120, these are merely examples. One of ordinary skill will recognize that aspects of the present disclosure may be implemented in communication protocols for various devices and device pairs (e.g., one or more UEs 130A-o, Providers 120A-m, and/or other devices or systems).

Figure 6:
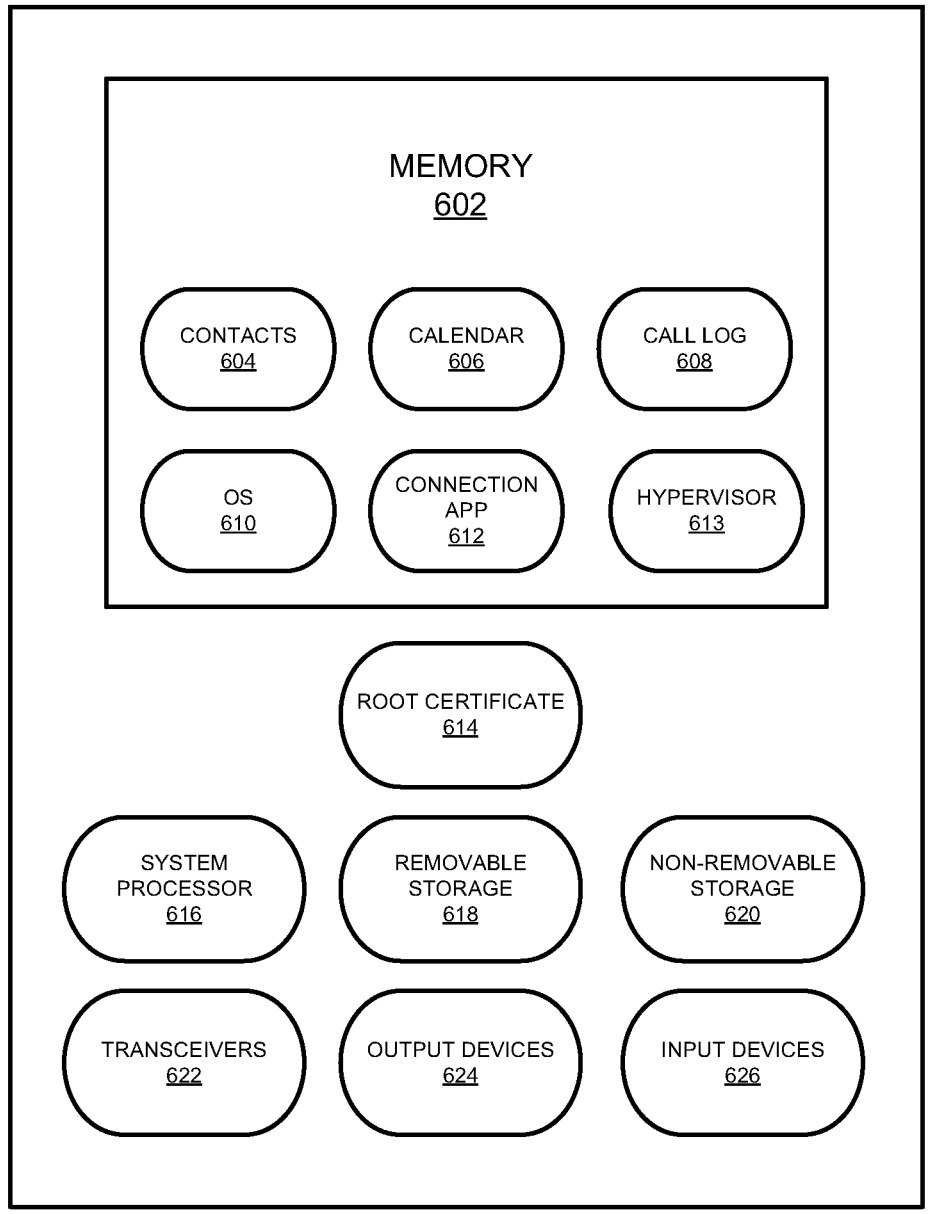
FIG. 6 is an example of a UE for use with the systems and methods disclosed herein, in accordance with some examples of the present disclosure.

As shown in FIG. 6, some, or all, of the system environment 100 and methods 200a, 200b, 200c, 300, 400, 500 may be performed by, and/or in conjunction with, UE 130. For clarity, UE 130 is described herein generally as a cell phone or smartphone. One of skill in the art will recognize, however, that the system environment 100 and methods 200a, 200b, 200c, 300, 400, 500 may also be used with a variety of other electronic devices, such as, for example, tablet computers, laptops, desktops, and another network (e.g., cellular or IP network) connected devices from which a call may be placed, a text may be sent, and/or data may be received. These devices are referred to collectively herein as UE 130. UE 130 may comprise a number of components to execute the above-mentioned functions and apps. As discussed below, UE 130 may comprise memory 602 including many common features such as, for example, contacts 604, a calendar 606, a call log (or, call history) 608, operating system (OS) 610, and one or more applications, such as connection app 612, and a hypervisor 613.

UE 130 may also comprise one or more root certificates 614 and one or more system processors 616. In some implementations, the system processor(s) 616 can include a central processing unit (CPU), a graphics processing unit (GPU), or both CPU and GPU, or any other sort of processing unit. UE 130 may also include one or more of removable storage 618, non-removable storage 620, one or more transceiver(s) 622, output device(s) 624, and input device(s) 626.

The root certificate 614 may be used to provide a means for attesting to VM instance utilization. For example, when a VM instance is instantiated, the VM instance may be hashed with the root certificate to generate an attestation certificate.

System processor 616 may be configured to receive a request to connect to an external device (e.g., another UE 130 or a Provider 120). The request may be received through input device 626 and/or through automatic routing. System processor 616 may request (e.g., from Node 110) attestation of the external device. The attestation may attest to the external device's use of VM instances, for example, on a ledger of the Attestation Node 110. Based on the attestation, the system processor 616 may either establish a connection with the external device (if the external device is determined to be communicating through a VM instance), or deny the request to connect to the external device (if the external device is determined to be potentially compromised).

In various implementations, the memory 602 may be volatile (such as random-access memory (RAM)), non-volatile (such as read-only memory (ROM), flash memory, etc.), or some combination of the two. The memory 602 may include all, or part, of the functions 604, 606, 608, 612, and the OS 610 for UE 130, among other things.

The memory 602 may also comprise contacts 604, which can include names, numbers, addresses, and other information about the user's business and personal acquaintances, among other things. In some examples, the memory 602 may also include a calendar 606, or other software, to enable the user to track appointments and calls, schedule meetings, and provide similar functions. In some examples, the memory 602 may also comprise the call log 608 of calls received, missed, and placed from UE 130. As usual, the call log 608 may include timestamps for each call for use by the system environment 100. Of course, the memory 602 can also include other software such as, for example, e-mail, text messaging, social media, and utilities (e.g., calculators, clocks, compasses, etc.).

The memory 602 may also include the OS 610. Of course, the OS 610 varies depending on the manufacturer of UE 130 and currently comprises, for example, iOS 12.1.4 for Apple products and Pie for Android products. The OS 610 contains the modules and software that supports a computer's basic functions, such as scheduling tasks, executing applications, and controlling peripherals.

As mentioned above, UE 130 may also include the connection app 612 and a hypervisor 613. The connection app 612 and hypervisor 613 may perform some, or all, of the functions discussed above with respect to the methods 200a, 200b, 200c, 300, 400, and 500 for interactions occurring between UE 130 and an external device (e.g., another UE 130, Provider 120, and/or Attestation Nodes 110). For example, when the connection app 612 is selected, hypervisor 613 may instantiate a VM instance, and connection app 612 may be executed within the VM instance. The connection app 612 may then communicate with Provider 120 without fear that other application on UE 130 will eavesdrop on connection app 612.

In some cases, the hypervisor may be a native hypervisor executing outside of OS 610. However, this is merely an example and, in an example, hypervisor 613 is hosted by OS 610.

UE 130 may also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 can store some, or all, of the functions 604, 606, 608, 612, and the OS 610.

Non-transitory computer-readable media may include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by UE 130. Any such non-transitory computer-readable media may be part of UE 130 or may be a separate database, databank, remote server, or cloud-based server.

In some implementations, the transceiver(s) 622 may include any sort of transceivers known in the art. In some examples, the transceiver(s) 622 can include a wireless modem to facilitate wireless connectivity with the other UEs, the Internet, and/or an intranet via a cellular connection. Further, the transceiver(s) 622 may include a radio transceiver that performs the function of transmitting and receiving radio frequency communications via an antenna (e.g., Wi-Fi or Bluetooth®). In other examples, the transceiver(s) 622 may include wired communication components, such as a wired modem or Ethernet port, for communicating with the other UE or the provider's Internet-based network. In this case, the transceiver(s) 622 can also enable UE 130 to communicate with the Nodes 110 and Providers 120, as described herein.

In some implementations, output device(s) 624 includes any sort of output devices known in the art, such as a display (e.g., a liquid crystal or thin-film transistor (TFT) display), a touchscreen display, speakers, a vibrating mechanism, or a tactile feedback mechanism. In some examples, output device(s) 624 can play various sounds based on, for example, whether UE 130 is connected to a network, the type of call being received (e.g., video calls vs. voice calls), the number of active calls, etc. In some examples, output device(s) 624 can play a sound or display a graphic when a new connection (e.g., with Provider 120) is requested, a Provider 120 is determined to be compromised, a connection is successful, etc. Output device(s) 624 also include ports for one or more peripheral devices, such as headphones, peripheral speakers, or a peripheral display.

In various implementations, input device(s) 626 includes any sort of input devices known in the art. The input device(s) 626 may include, for example, a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 7:
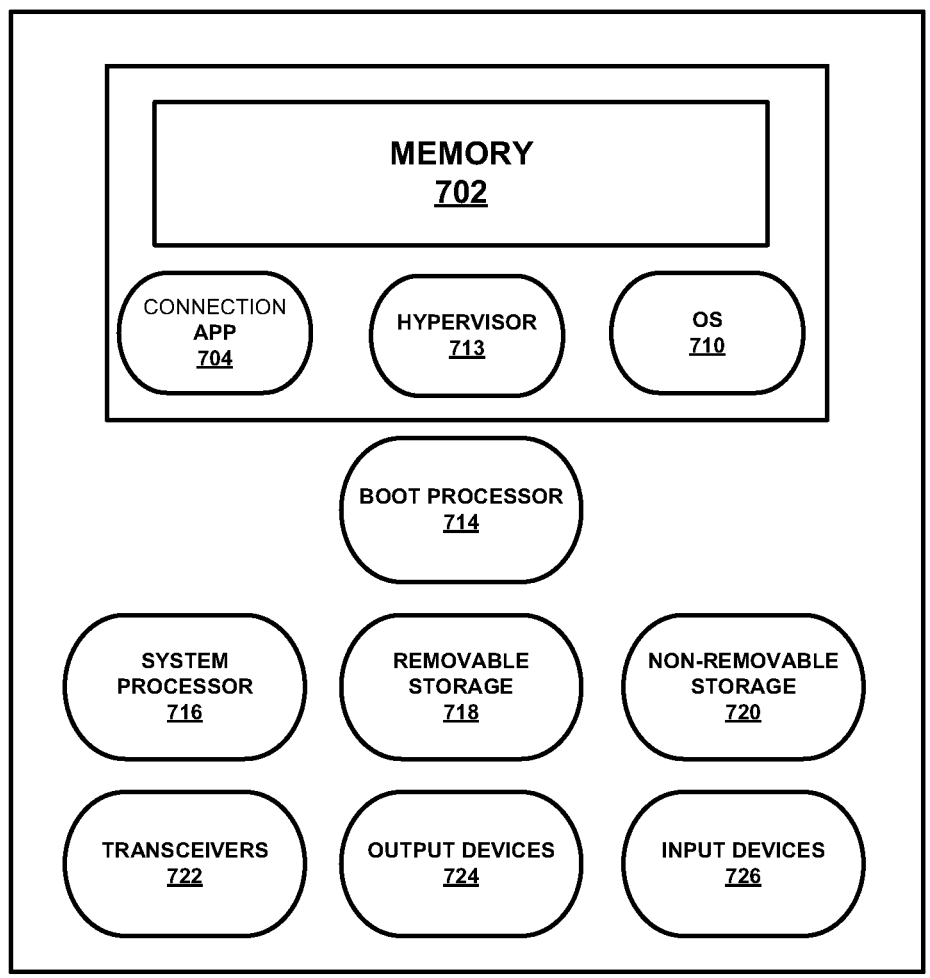
FIG. 7 is an example of a server for use with the systems and methods disclosed herein, in accordance with some examples of the present disclosure.

As shown in FIG. 7, the system environment 100 and methods 200a, 200b, 200c, 300, 400, 500 may also be used in conjunction with a server 700 (e.g., Provider 120 and/or Attestation Node 110). The server 700 can comprise, for example, a desktop or laptop computer, a server, bank of servers, or cloud-based server bank. Thus, while the server 700 is depicted as single standalone servers, other configurations or existing components could be used. In some examples, the server 700 may comprise existing network entities such as, for example, a home location register (HLR), home subscriber service (HSS), a third-generation partnership project authentication, authorization and accounting (3GPP AAA) server, or another server or component. The server 700 may implement aspects of Provider 120 and/or Node 110.

The server 700 may comprise a number of components to execute the above-mentioned functions and apps. As discussed below, the server 700 may comprise memory 702 including many common features such as, for example, the OS 710. In various implementations, the memory 702 may be volatile (such as random access memory (RAM)), non-volatile (such as read-only memory (ROM), flash memory, etc.), or some combination of the two. The memory 702 may include all, or part, of the functions of a connection app 704 and hypervisor 713, among other things.

The memory 702 may also include the OS 710. Of course, the OS 710 varies depending on the manufacturer of the server 700 and the type of component. Many servers, for example, run Linux or Windows Server. Dedicated cellular routing servers may run specific telecommunications OS 710. The OS 710 contains the modules and software that supports a computer's basic functions, such as scheduling tasks, executing applications, and controlling peripherals.

A connection app 704 may provide communication between the server 700 and external systems (e.g., UE 130, other Providers 120, and/or Nodes 110). Hypervisor 713 may instantiate, manage, and delete VM instances and/or applications (e.g., connection app 704) executing thereon.

The server 700 may also comprise one or more boot processor(s) 714 and system processors 716. Boot processor 714 may aid in system start-up. In some implementations, the system processor(s) 716 can include a central processing unit (CPU), a graphics processing unit (GPU), or both CPU and GPU, or any other sort of processing unit. The server 700 may also include one or more of removable storage 718, non-removable storage 720, one or more transceiver(s) 722, output device(s) 724, and input device(s) 726.

System processor 716 may be configured to receive a request to connect to an external device (e.g., UE 130 or another server 700). System processor 716 may request (e.g., from Node 110) attestation of the external device. For example, attestation may be a self-attestation stored on a ledger of the Attestation Node 110. Based on the attestation, the system processor 716 may either establish a connection with the external device (if the external device is determined to be valid), or deny the request to connect to the external device (if the external device is determined to be compromised).

The server 700 may also include additional data storage devices (removable and/or non-removable) such as, for example, magnetic disks, optical disks, or tape. Such additional storage is illustrated in FIG. 7 by removable storage 718 and non-removable storage 720. The removable storage 718 and non-removable storage 720 may store some, or all, of the OS 710, hypervisor 713, and connection app 704.

Non-transitory computer-readable media may include volatile and nonvolatile, removable and non-removable tangible, physical media implemented in technology for storage of information, such as computer readable instructions, data structures, program modules, or other data. The memory 702, removable storage 718, and non-removable storage 720 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which may be used to store the desired information, and which can be accessed by the server 700. Any such non-transitory computer-readable media may be part of the server 700 or may be a separate database, databank, remote server, or cloud-based server.

In some implementations, the transceiver(s) 722 include any sort of transceivers known in the art. In some examples, the transceiver(s) 722 may include a wireless modem to facilitate wireless connectivity with UEs 130, additional servers, the Internet, and/or an intranet via a cellular connection. Further, the transceiver(s) 722 may include a radio transceiver that performs the function of transmitting and receiving radio frequency communications via an antenna (e.g., Wi-Fi or Bluetooth®). In other examples, the transceiver(s) 722 may include wired communication components, such as a wired modem or Ethernet port, for communicating with the other UEs or the provider's Internet-based network. The transceiver(s) 722 may transmit requests to and receive attestation information from Attestation Node (s) 110, and send messages to UEs 130, among other things.

In some implementations, the output device(s) 724 may include any sort of output devices known in the art, such as a display (e.g., a liquid crystal or thin-film transistor (TFT) display), a touchscreen display, speakers, a vibrating mechanism, or a tactile feedback mechanism. In some examples, the output devices may play various sounds based on, for example, whether the server 700 is connected to a network, the type of data being received (e.g., a match vs. a request for service listings), when SIM-OTA messages are being transmitted, etc. Output device(s) 724 may also include ports for one or more peripheral devices, such as headphones, peripheral speakers, or a peripheral display.

In various implementations, input device(s) 726 includes any sort of input devices known in the art. For example, the input device(s) 726 may include a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 8:
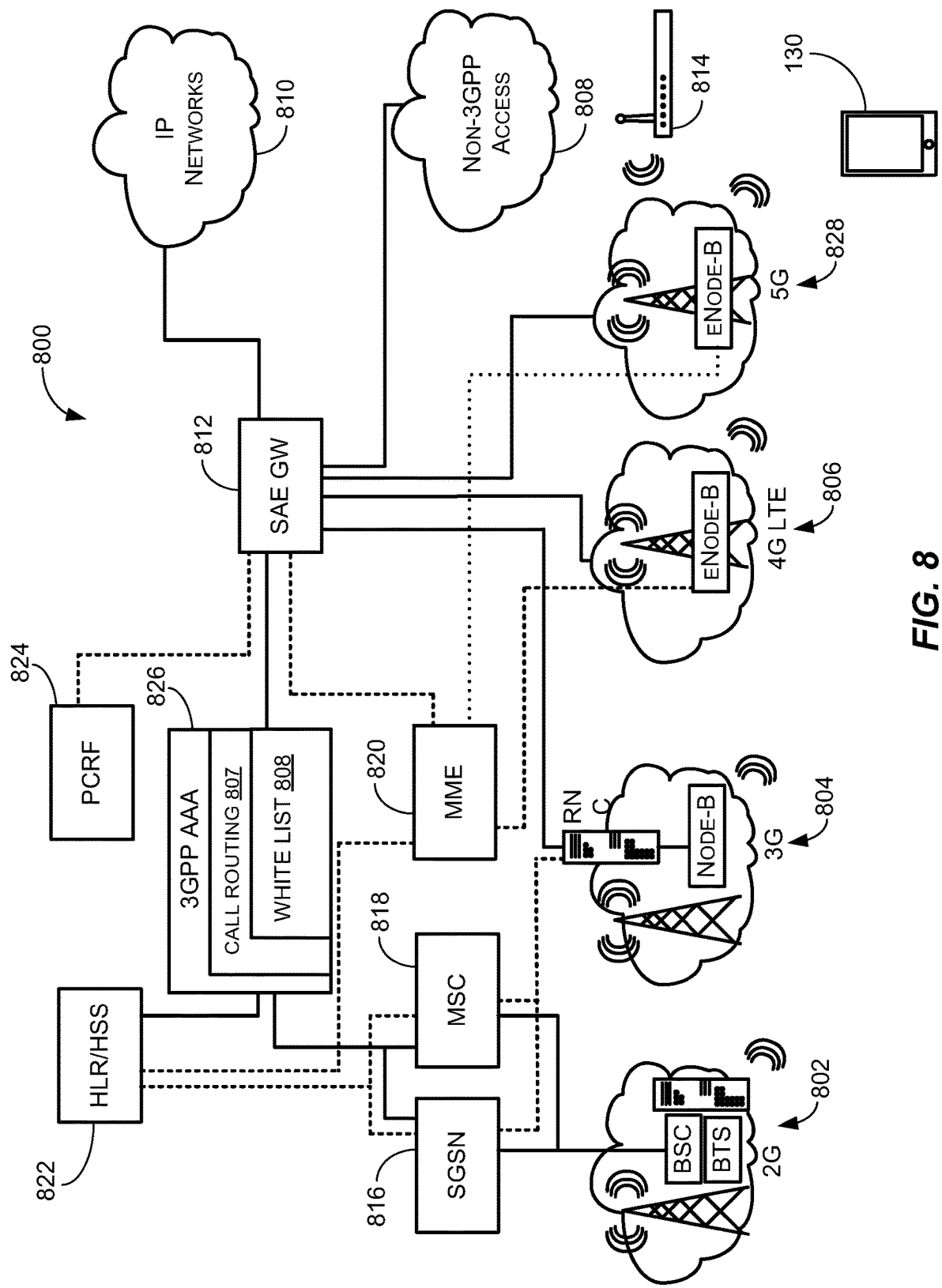
FIG. 8 is an example cellular and internet protocol network for use with some examples of the present disclosure.

FIG. 8 depicts a conventional cellular network 800 including 2G 802, 3G 804, 4G long-term evolution (LTE) 806, and 5G 828 components. Of course, future technologies, such as, for example, 5G and device-to-device (D2D)

components could also be included and are contemplated herein. Many of the "back-end" components of network 800 could handle some, or all, of system environment 100 and methods 200*a*, 200*b*, 200*c*, 300, 400, 500 associated with remote device security attestation and manipulation detection.

As is known in the art, data may be routed from the Internet or other sources using a circuit switched modem connection (or non-3GPP connection), which provides relatively low data rates, or via IP based packet switched 810 connections, which results is higher bandwidth. LTE system 806, which is purely IP based, essentially "flattens" the architecture, with data going straight from the internet to service architecture evolution gateway (SAE GW) 812 to evolved Node B transceivers 806, enabling higher throughput. UE 130 also has wireless local area network (WLAN) 814 capabilities, in some cases enabling even higher throughput. In some cases, cellular carriers may use WLAN communications in addition to, or instead of, cellular communications to supplement bandwidth.

Serving GPRS support node (SGSN) 816 is a main component of the general packet radio service (GPRS) network, which handles all packet switched data within the network 800 (e.g., the mobility management and authentication of the users). MSC 818 essentially performs the same functions as SGSN 816 for voice traffic. MSC 818 is the primary service delivery node for global system for mobile communication (GSM) and code division multiple access (CDMA), responsible for routing voice calls and short messaging service (SMS) messages, as well as other services (such as conference calls, fax, and circuit switched data). MSC 818 sets up and releases the end-to-end connection, handles mobility and hand-over requirements during the call, and takes care of charging and real-time pre-paid account monitoring.

Similarly, mobility management entity (MME) 820 is the key control-node for 4G LTE network 806 and 5G 828. It is responsible for idle mode UE 130 paging and tagging procedures including retransmissions. MME 820 is involved in the bearer activation/deactivation process and is also responsible for choosing SAE GW 812 for UE 130 at the initial attach and at time of intra-LTE handover involving Core Network (CN) node relocation (i.e., switching from one cell tower to the next when traveling). MME 820 is responsible for authenticating the user (by interacting with the HSS 822 discussed below). The Non-Access Stratum (NAS) signaling terminates at the MME 820 and it is also responsible for generation and allocation of temporary identities to UE 130. The MME 820 also checks the authorization of UE 130 to camp on the service provider's HPLMN or VPLMN and enforces UE 130 roaming restrictions on the VPLMN. MME 820 is the termination point in the network for ciphering/integrity protection for NAS signaling and handles the security key management. MME 820 also provides the control plane function for mobility between LTE 806 and 2G 802/3G 804 access networks with an S3 interface terminating at MME 820 from SGSN 816. MME 820 also terminates an S7a interface towards home HSS 822 for roaming UE 130.

Referring to 5G 828, MME 820 may be configured to respond to an initial attach request by sending a create session request to a network slice selector, also referred to herein as a slice selector and/or a network selector. The create session request may be sent over a logical communication interface that is referred to as an NG4 interface. The NG4 interface typically is used for messaging between the control plane function and the user plane forwarding function of a 5G network. Aspects of the present disclosure may be implemented within containerization of Software Defined Networks (SDN) of 5G nodes, and/or Network Function Virtualization (NfV). As will be understood by one of ordinary skill, SDN decouples traditionally decentralized network control from the physical devices, enabling programmatic control and infrastructure abstraction.

In response to receiving a create session request, the network slice selector may determine which of the available network slices should be used to provide services for UE 130 and may redirect the create session request to the selected network slice. For example, the create session request may be directed to a gateway component of the selected network slice. Specific for a 5G network, the gateway component may comprise a user plane forwarding function.

HSS/HLR 822 is a central database that contains user-related and subscription-related information. The functions of HSS/HLR 822 include functionalities such as mobility management, call and session establishment support, user authentication and access authorization. HSS, which is used for LTE connections, is based on the previous HLR and Authentication Center (AuC) from CGMA and GSM technologies, with each serving substantially the same functions for their respective networks.

The policy and charging rules function (PCRF) 824 is a software node that determines policy rules in network 800. PCRF 824 generally operates at the network core and accesses subscriber databases (e.g., HSS/HLR 822) and other specialized functions, such as enhanced e911 call handling, in a centralized manner. PCRF 824 is the main part of network 800 that aggregates information to and from network 800 and other sources (e.g., IP networks 810). PCRF 824 may support the creation of rules and then may automatically make policy decisions for each subscriber active on network 800. PCRF 824 may also be integrated with different platforms like billing, rating, charging, and subscriber database or may also be deployed as a standalone entity.

Finally, 3GPP AAA server 826 performs authentication, authorization, and accounting (AAA) functions (e.g., call routing 807 and/or white listing 808) and may also act as an AAA proxy server. For WLAN 814 access to (3GPP) IP networks 810 3GPP AAA Server 826 provides authorization, policy enforcement, and routing information to various WLAN components. 3GPP AAA Server 826 may generate and report charging/accounting information, performs offline charging control for WLAN 814, and perform various protocol conversions when necessary.

While several possible examples are disclosed above, examples of the present disclosure are not so limited. While the system environment 100 and methods 200*a*, 200*b*, 200*c*, 300, 400, 500 above are discussed with reference to use with cellular communications, for instance, the system environment 100 and methods 200*a*, 200*b*, 200*c*, 300, 400, 500 can be used for other types of wired and wireless communications. In addition, while various functions are discussed as being performed on UE 130, by Provider 120, or Nodes 110, other components could perform the same or similar functions without departing from the spirit of the present disclosure.

The specific configurations, machines, and the size and shape of various elements can be varied according to particular design specifications or constraints requiring a UE 130, server 700, system environment 100, network 800, or method 200*a*, 200*b*, 200*c*, 300, 400, 500 constructed according to the principles of this disclosure. Such changes are intended to be embraced within the scope of this disclosure.

The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A user equipment (UE) comprising:
a processor;
a transceiver; and
a memory storing instructions that, when executed by the processor, controls the processor to:
receive a communication request to communicate with a remote system;
instantiate, in response to receiving the communication request, a UE virtual machine instance on the UE, the UE virtual machine instance being hashed with a root certificate when the UE virtual machine instance is instantiated, the root certificate certifying underlying hardware of the UE virtual machine instance;
execute, on the UE virtual machine instance, an application for processing the communication request;
transmit, through the transceiver and to an attestation server, the root certificate to attest to the execution of the application within the UE virtual machine instance;
establish a communication link between the application and the remote system; and
communicate, via the transceiver, with the remote system across the communication link.

2. The UE of claim 1, wherein the instructions, when executed by the processor, further control the processor to:
poll the attestation server to determine whether the remote system is operating a remote system virtual machine instance; and
establish the communication link only in response to determining that the remote system is operating the remote system virtual machine instance.

3. The UE of claim 1, wherein
the instructions, when executed by the processor, further control the processor to receive the communication request through the transceiver and from the remote system, and
wherein the communication request indicates that the remote system requires the application for processing the communication request must be executed within an isolated virtual machine instance.

4. The UE of claim 1, wherein the instructions, when executed by the processor, further control the processor to determine, based on a type of communication request, that the application for processing the communication request must be executed within an isolated virtual machine instance.

5. The UE of claim 1, wherein the instructions, when executed by the processor, further control the processor to determine that the application for processing the communication request must be executed within an isolated virtual machine instance based on a pre-existing user selection of the application.

6. The UE of claim 1, wherein the instructions, when executed by the processor, further control the processor to, in response to the communication link closing, close the application and delete the UE virtual machine instance.

7. The UE of claim 6, wherein the instructions, when executed by the processor, further control the processor to, prior to deleting the UE virtual machine instance, persist communication information corresponding to the communication link outside of the UE virtual machine instance.

8. The UE of claim 7, wherein the instructions, when executed by the processor, further control the processor to:
establish a connection with an operating system of the UE; and
transmit the communication information to the operating system to persist the communication information on the UE.

9. A server comprising:
a processor;
a transceiver;
a memory storing instructions that, when executed by the processor, controls the processor to:
transmit, through the transceiver and to a remote system, a communication request, the communication request indicating that communication must be conducted through a secure virtual machine instance;
receive, through the transceiver and from a remote system application executing on the remote system, a communication response indicating acceptance of the communication request;
transmit, through the transceiver, a request to an attestation server to determine whether the remote system application is executing on a remote system virtual machine instance on the remote system, the remote system having attested to the execution of the remote system application on the remote system virtual machine instance by transmitting a root certificate to the attestation server, the root certificate being hashed on the remote system virtual machine instance when the remote system virtual machine instance was instantiated;
establish, in response to determining that the remote system application is executing on a remote system virtual machine instance on the remote system, a communication link between the server and the remote system application; and
communicate with the remote system application using the communication link.

10. The server of claim 9, wherein the instructions, when executed by the processor, further control the processor to:
instantiate a server virtual machine instance; and
execute a server application within the server virtual machine instance, the communication link being established between the server application and the remote system application.

11. The server of claim 10, wherein the instructions, when executed by the processor, further control the processor to:
generate a root certificate for the server virtual machine instance; and
transmit, with the transceiver and to the attestation server, the root certificate to attest to execution of the server application within the server virtual machine instance.

12. The server of claim 10, wherein the instructions, when executed by the processor, further control the processor to, in response to the communication link closing, close the server application and delete the server virtual machine instance.

13. The server of claim 12, wherein the instructions, when executed by the processor, further control the processor to, prior to deleting the server virtual machine instance, persist communication information corresponding to the communication link outside of the server virtual machine instance.

14. The server of claim 13, wherein the instructions, when executed by the processor, further control the processor to, prior to the communication link closing:

output, through the communication link and to the remote system application, a request for instruction for persisting the communication information; and receive, through the communication link and from the remote system application, user instruction for persisting the communication information, the communication information being persisted in accordance with the user instruction.

15. A method comprising:

receiving, by a local system, a communication request to communicate with a remote system;

instantiating, in response to receiving the communication request, a local virtual machine instance on the local system, the local virtual machine instance being hashed with a root certificate when the local virtual machine instance is instantiated, the root certificate certifying underlying hardware of the local virtual machine instance;

executing, on the local virtual machine instance, an application for processing the communication request;

transmitting, through a transceiver of the local system and to an attestation server, the root certificate to attest to the execution of the application within the local virtual machine instance;

establishing a communication link between the application and the remote system; and communicating, via the transceiver, with the remote system across the communication link.

16. The method of claim 15 further comprising polling, by the local system, the attestation server to determine whether the remote system is operating a remote system virtual machine instance, wherein establishing the communication link comprises establishing the communication link in response to determining that the remote system is operating the remote system virtual machine instance.

17. The method of claim 15, wherein the communication request is received through the transceiver and from the remote system, and the communication request indicates that the remote system requires the application for processing the communication request must be executed within an isolated virtual machine instance.

18. The method of claim 17 further comprising polling, by the local system, the attestation server to determine whether the remote system is operating a remote system virtual machine instance, wherein instantiating the local virtual machine instance is further in response to determining that the remote system is operating the remote system virtual machine instance.

19. The method of claim 15 further comprising, in response to the communication link closing, closing the application and deleting the local virtual machine instance.

20. The method of claim 19 further comprising, prior to deleting the local virtual machine instance, persist communication information corresponding to the communication link outside of the local virtual machine instance.

* * * * *